(12) United States Patent
Keeney et al.

(10) Patent No.: US 7,280,090 B2
(45) Date of Patent: Oct. 9, 2007

(54) METHODS AND APPARATUS FOR REPAIRING INOPERATIVE PIXELS IN A DISPLAY

(75) Inventors: Richard A. Keeney, Minneapolis, MN (US); Farhad Nourbakhsh, Apple Valley, MN (US); Anthony Clark, Eagan, MN (US)

(73) Assignee: Electronics for Imaging, Inc., Foster City, CA (US)

( * ) Notice: Subject to any disclaimer, the term of this patent is extended or adjusted under 35 U.S.C. 154(b) by 58 days.

(21) Appl. No.: 09/748,623

(22) Filed: Dec. 22, 2000

(65) Prior Publication Data

US 2002/0113766 A1 Aug. 22, 2002

(51) Int. Cl.
G09G 3/36 (2006.01)

(52) U.S. Cl. .................. 345/93; 345/90; 345/98; 345/99; 345/100; 345/206

(58) Field of Classification Search .................. 345/87, 345/100, 103–104, 204–206, 98–99, 90–94; 438/690, 4, 98, 598, 707, 720; 257/59, 292; 324/537, 527, 765; 349/73, 74
See application file for complete search history.

(56) References Cited

U.S. PATENT DOCUMENTS

| | | | |
|---|---|---|---|
| 4,825,201 A | 4/1989 | Watanabe | |
| 5,173,792 A | 12/1992 | Matsueda | |
| 5,235,272 A | 8/1993 | Henley | |
| 5,459,410 A | 10/1995 | Henley | |
| 5,546,207 A | 8/1996 | Kim | |
| 5,648,826 A | 7/1997 | Song | |
| 5,691,786 A | 11/1997 | Nakai | |
| 5,744,821 A | 4/1998 | Song | |
| 5,926,156 A * | 7/1999 | Katoh et al. ................. | 345/55 |
| 5,945,984 A | 8/1999 | Kuwashiro | |
| 5,969,779 A | 10/1999 | Kim | |
| 5,976,978 A | 11/1999 | Salisbury | |
| 6,005,649 A * | 12/1999 | Krusius et al. ............... | 349/73 |
| 6,518,945 B1 * | 2/2003 | Pinkham ..................... | 345/92 |
| 6,618,115 B1 * | 9/2003 | Hiroki ........................ | 349/192 |
| 6,816,143 B1 * | 11/2004 | Lambert ..................... | 345/93 |

FOREIGN PATENT DOCUMENTS

EP 0 375 233 6/1990

OTHER PUBLICATIONS

*Patent Abstracts of Japan*, Abstract of Japanese Patent "Liquid Crystal Display Device", Publication No. 06308532, Nov. 4, 1994, vol. 1995, No. 2, Mar. 31, 1995.

(Continued)

*Primary Examiner*—Richard Hjerpe
*Assistant Examiner*—Leonid Shapiro
(74) *Attorney, Agent, or Firm*—James Trosino

(57) ABSTRACT

Methods and apparatus for repairing inoperative pixels in a display are provided. In particular, the present invention provides methods and apparatus for improving the effective yield rates of displays, such as liquid crystal micro-displays, by disconnecting inoperative pixels from their defective drive circuitry and tying such pixels to the working drive circuit of a nearby pixel. A display can be repaired without the need to provide redundant drive circuitry underneath each pixel.

18 Claims, 6 Drawing Sheets

OTHER PUBLICATIONS

*Patent Abstracts of Japan*, Abstract of Japanese Patent "TFT Array Substrate as Well as Liquid Crystal Display Device Formed By Using the TFT Array Substrate and Production of TFT Array Substrate", Publication No. 09005786, Jan. 10, 1997, vol. 1997, No. 5, May 30, 1997.

*Patent Abstracts of Japan*, Abstract of Japanese Patent "Active Matrix Substrate and Method for Correcting Defect of Display Device", Publication No. 09054340, Feb. 25, 1997, vol. 1997, No. 6, Jun. 30, 1997.

* cited by examiner

SINGLE-PIXEL (1 X 1).

4-PIXEL GROUP (2 X 2).

8-PIXEL GROUP (4 X 2).

16-PIXEL GROUP (4 X 4).

METHODS AND APPARATUS FOR REPAIRING INOPERATIVE PIXELS IN A DISPLAY

BACKGROUND OF THE INVENTION

The present invention provides methods and apparatus for repairing inoperative pixels in a display. In particular, the present invention provides methods and apparatus for improving the effective yield rates of displays, such as liquid crystal micro-displays, by disconnecting inoperative pixels from their defective drive circuitry and tying such pixels to the working drive circuit of a nearby pixel.

Manufacturing of displays, such as liquid crystal (LC) micro-displays, with very large numbers of pixels is hampered by low yield rates due to the large area of semiconductor material (e.g., Complementary Metal Oxide Semiconductor (CMOS)) required for each device. Nevertheless, displays can actually tolerate a certain level of various types of defects and still be considered acceptable. Additionally, there are various techniques that have been developed and successfully applied to other display technologies that can reduce the visibility of some types of defects and dramatically increase the yield of acceptable displays.

For example, on a device size suitable to hold 8 million pixels (approximately 32×58 mm), without any repair strategy, the yield of "perfect" display devices is estimated at less than 2% (assumed defect rate of $0.2/cm^2$).

Defects in the microelectronic circuitry can cause a variety of types of malfunctions in the resulting display, such as:

| | |
|---|---|
| Stuck-ON Pixel | These pixels are always ON. In a three-chip RGB (red, green, blue) system, they would be visible as a constant red, green, or blue dot in the display. Such stuck-ON pixels are much more visible in dark areas of the display than bright areas. |
| Stuck-OFF Pixel | These pixels are always OFF. In a three-chip RGB system, they would be visible as a constant cyan, magenta, or yellow dot in the display. Such stuck-OFF pixels are much more visible in the bright areas of the display than the dark areas. |
| Stuck-Intermediate | Some pixels can get stuck in an intermediate state. Depending on the intended color of the pixel and the surrounding area of the display, they will sometimes appear as red, green, or blue, and at other times will appear as the complement of the color channel affected. |
| Partial Response | Some pixels may have a portion of their circuitry affected such that they partially respond to the intended color. Perhaps they are of reduced intensity or contrast, but they still track the intended value to some degree. |
| Defective Clump | A significant portion of the circuitry in the visible area may be shared between clumps of pixels. A defect in this area may effect the entire clump of pixels and may take any of the above forms. |
| Dead Column/Row | Defects in signals generated by the drive circuitry which are fed to every pixel in a column or row will manifest themselves in the entire column or row. The manifestation may take a variety of forms. |

Although a display having any of the foregoing defects may still be useable, all such defects are significant enough that once noticed, the user will be unhappy. The only exception being perhaps a few isolated stuck-OFF pixels in the display used for the blue channel, due to the low contrast sensitivity of human vision to blue light.

A previously known method for dealing with such defects is to provide redundant circuitry in the display that can be selected to drive a pixel or column of pixels in the event of a defect in the primary circuitry. As it is already difficult to fit all required circuitry in the space available in such micro-displays, the inclusion of redundant circuitry becomes problematic.

It would be advantageous to provide a method of repairing inoperative pixels in a display without requiring redundant circuitry in order to increase the yield rate of such displays.

The methods and apparatus of the present invention provide the aforementioned and other advantages.

SUMMARY OF THE INVENTION

The present invention provides methods and apparatus for repairing inoperative pixels in a display. In particular, the present invention provides methods and apparatus for improving the effective yield rates of displays, such as liquid crystal micro-displays, by disconnecting inoperative pixels from their defective drive circuitry and connecting such pixels to the working drive circuit of a nearby pixel.

The "repaired" pixel will then display the same value as the nearby pixel that it is connected to. However, since in most images, neighboring pixels are highly likely to be displaying similar values, the resulting slight error in the image is very well below acceptable limits for almost all applications. Most viewers find it difficult to detect such an artifact at all even when it is pointed out to them. As the display resolution goes higher, this type of repair becomes even more difficult to detect.

In an illustrated embodiment of the present invention, an electronic display is provided which is capable of repairing inoperative pixels. The display comprises a plurality of pixels with drive circuitry for controlling the pixels. Means for disconnecting an inoperative pixel from its defective drive circuitry are provided. The inoperative pixel is then provided with a connection to a working drive circuit of a nearby pixel.

The means for connecting the inoperative pixel to a working drive circuit may comprise additional circuitry associated with each pixel in the display. This additional circuitry connects the inoperative pixel to the working drive circuit of a nearby pixel.

In one embodiment, the additional circuitry may comprise a bypass bit latch. When the bypass bit is set, the defective drive circuitry is bypassed and the inoperative pixel is driven from the working drive circuit of a nearby pixel. The bypass bit may be loaded from an external memory after the display is turned ON. In addition, multiplexing circuitry associated with the bypass bit latch may be provided.

Alternatively, the additional circuitry may further comprise a tri-state transistor associated with each pixel connected to the bypass bit latch and a resistor coupling neighboring pixels. When the bypass bit is set, the transistor is switched to bypass the defective drive circuitry so that the inoperative pixel is driven from the working drive circuit of a nearby pixel through the resistor.

In a further embodiment, the additional circuitry may comprise a resistive connection between neighboring pixel metal layers. The defective drive circuitry can be disconnected from the inoperative by severing a via connecting the defective drive circuitry to the inoperative pixel, such that the inoperative pixel is driven by a nearby pixel through the resistive connection.

Alternatively, the additional circuitry may comprise a capacitive connection between neighboring pixel metal layers. The defective drive circuitry can be disconnected from the inoperative pixel by severing a via connecting the defective drive circuitry to the inoperative pixel, such that the inoperative pixel is driven by a nearby pixel through the capacitive connection.

The via may be severed, for example, by laser ablation, melting or ablation of a fusible link by passing sufficient current through it, selective chemical etching using a photoresist or other selection means, melting or ablation with an electron beam, melting or ablation with a focused microwave or other electro-magnetic beam, electro-ionic erosion, physical cutting or removal of the metal using a sharp or abrasive implement or probe, or by any other suitable technique.

The pixels may be repaired individually or in groups (i.e., groups of up to 8 adjacent inoperative pixels may be repaired without significantly impacting the quality of the display).

In a further embodiment, the display may also comprise test circuitry to identify the defective drive circuitry.

The pixel drive circuitry associated with each pixel may be located adjacent to each pixel or located separately from each pixel.

The display may be a liquid crystal micro-display or a similar display device.

DETAILED DESCRIPTION OF THE INVENTION

The present invention relates to methods and apparatus for repairing inoperative pixels in a display. In particular, the present invention provides methods and apparatus for improving the effective yield rates of displays, such as liquid crystal micro-displays, by disconnecting inoperative pixels from their defective drive circuitry and connecting such pixels to the working drive circuit of a nearby pixel.

The invention is particularly adapted for use with a traditional reflective Ferro-electric liquid crystal on complimentary metal oxide semiconductor (FLC-on-CMOS) micro-display assembly with the LC material being placed on top of a CMOS control chip. Pads on the top layer of the CMOS chip provide both electrical control of the LC material as well as the optical mirror for the light.

Such a display may have 8.3 million pixels arranged as 3840 pixels by 2160 pixels. The pixels may be on a 15 μm pitch. The size of the active area of this exemplary display is thus 57.6×32.4 mm. Additional control circuitry and frame buffer memory (e.g., Dynamic Random Access Memory (DRAM)) along the two long sides of the circuit may be 61.4×3 mm. Input/output (I/O) pads and an LCD seal ring would add another couple few millimeters to the overall dimensions of the chip, but these areas would be relatively immune from the very small defects typical of the CMOS process. The invention is also applicable to displays of varying sizes and types.

A significant amount of functionality in the circuitry under each pixel is desired. The basic modulation for each pixel may be, for example, a 10-bit counter running on a chirped clock to produce a log or gamma-corrected response. Generation of the pulse timing required by the LC material is also required under each pixel. Diagnostic capabilities may be included to verify correct operation of the control circuit for each pixel. Finally, an additional 10 bits of storage may be desired to allow loading of the data for a next frame to be distributed over the entire frame time.

Fitting this circuitry in the available space has proven challenging and drives the design towards a larger pixel pitch compared to existing designs. The smallest feasible CMOS feature sizes are also utilized. Even still, for the desired complex pixel control functionality, typical prior art redundant repair circuitry is problematic to provide in the available space.

Figure 1:
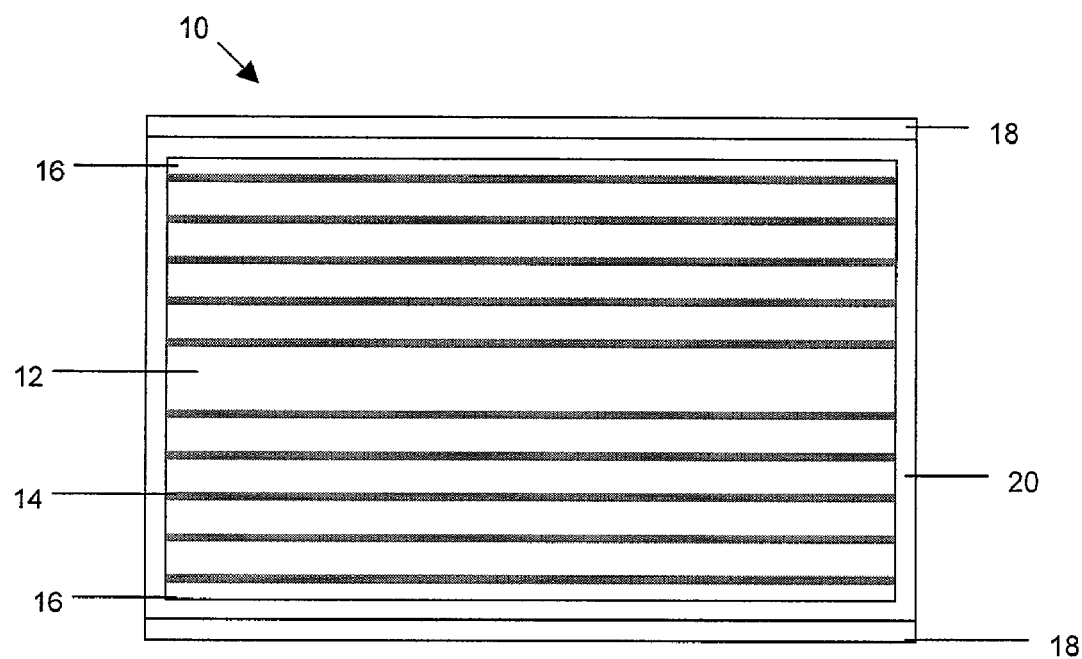
FIG. 1 illustrates an embodiment of a liquid crystal micro-display assembly in accordance with the present invention.

FIG. 1 illustrates the arrangement of a liquid crystal-micro display in accordance with the present invention. Display area 10 is divided into several sections due to the differing impacts that defects in each section will have on the display yield. Pixel drive and repair circuitry 12 covers the majority of the device area (e.g., the pixel drive circuitry comprises 92% of the active area or approximately 17.2 cm$^2$ and the pixel repair circuitry comprises 4% of the active area or approximately 0.07 cm$^2$). By providing the repair mechanisms described herein, most types of defects in this circuitry can be tolerated and still result in acceptable devices.

Signal distribution buffer circuitry 14 may comprise 4% of the active area of the display or approximately 0.07 cm$^2$. Signals in the display are routed to every pixel in a column. Distribution buffer circuitry 14 will be required to fan these signals out over the large number of loads and distances and still meet timing requirements. Defects in these buffers will render large portions of the display inoperable and render the display unusable.

Column signal generation logic (1.2 cm$^2$) and Buffer DRAM (1.8 cm$^2$) are provided at 16. Column signal generation logic generates the signals for each column. Defects in this area are highly likely to render the entire display unusable since the error is likely to impact a large area of the display such as an entire column or more. Buffer DRAM is similar to conventional DRAM. If yield is a problem in this area, traditional DRAM techniques of including spare rows and columns can be employed.

Input/output (I/O) pads 18 are provided. These features typically do not contribute to low yield. Cover Glass Glue-Down Area 20 also consumes a portion of the wafer, but typically does not have any features that would contribute to low yield.

In an illustrated embodiment of the present invention as shown in FIG. 1, an electronic display 10 is provided which is capable of repairing inoperative pixels. The display comprises a plurality of pixels with drive circuitry 12 for controlling the pixels. Means for disconnecting an inoperative pixel from its defective drive circuitry are provided. The inoperative pixel is then provided with a connection to a working drive circuit of a nearby pixel.

Using the drive circuitry 12 of a neighboring pixel to drive an otherwise inoperative pixel will result in the two pixels displaying the same intensity. Visual artifacts will typically be visible in the case of high contrast textures and edges moving across the two tied-together pixels at a slow rate.

The means for connecting the inoperative pixel to a working drive circuit may comprise additional circuitry associated with each pixel in the display that connects the inoperative pixel to the working drive circuit of a nearby pixel. The additional circuitry may comprise discrete or integrated circuitry.

Figure 2:
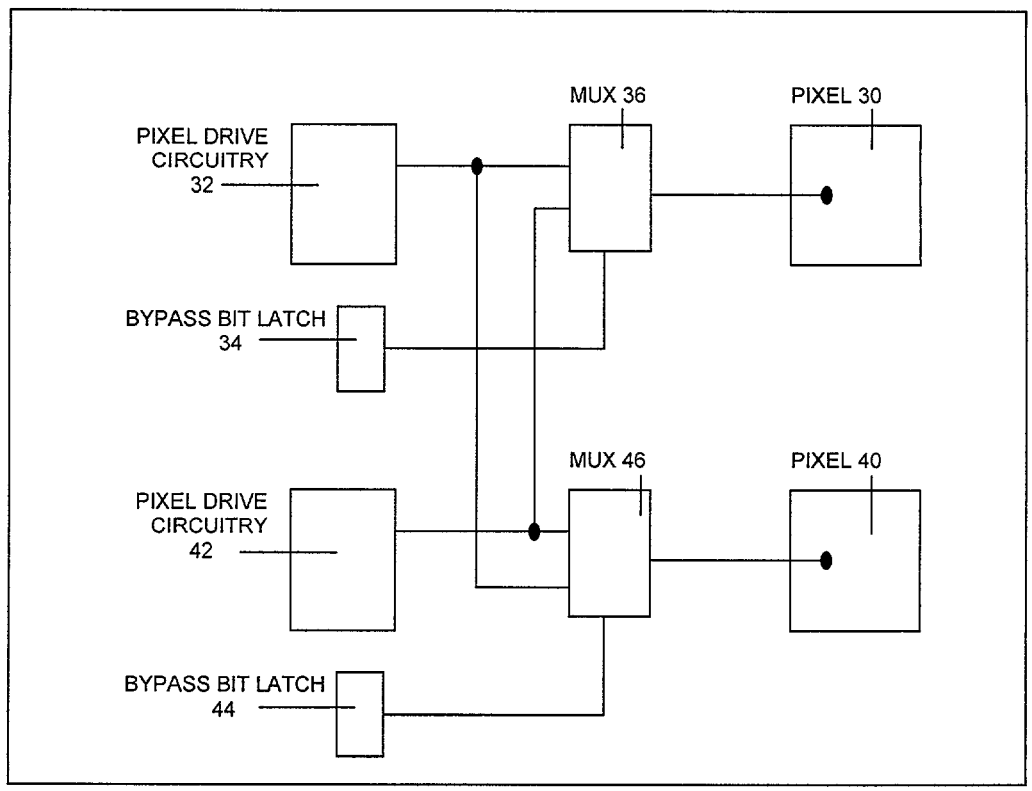
FIG. 2 shows a schematic representation of an embodiment of repair circuitry in accordance with the present invention.

In one embodiment as shown in FIG. 2, the additional circuitry may comprise bypass bit latches 34, 44 which can select the source of the drive signal for pixels 30, 40. When a bypass bit is set, the defective drive circuitry is bypassed and the inoperative pixel is driven from the working drive circuit of a nearby pixel. The bypass bit may be loaded from an external memory after the display is turned ON. For example, in FIG. 2, assume that pixel 30 is inoperative due to defective drive circuitry 32. After the display is turned ON, bypass bit 34 associated with the inoperative pixel 30 is set such that defective drive circuitry 32 is bypassed and inoperative pixel 30 is driven by working drive circuitry 42 of a nearby pixel 40. In addition, multiplexing circuitry 36, 46 associated with bypass bit latches 34, 44 may be provided. An advantage of such an arrangement is that testing and repair can be accomplished at any time in the manufacturing process, even after assembly of the LCD.

Figure 3:
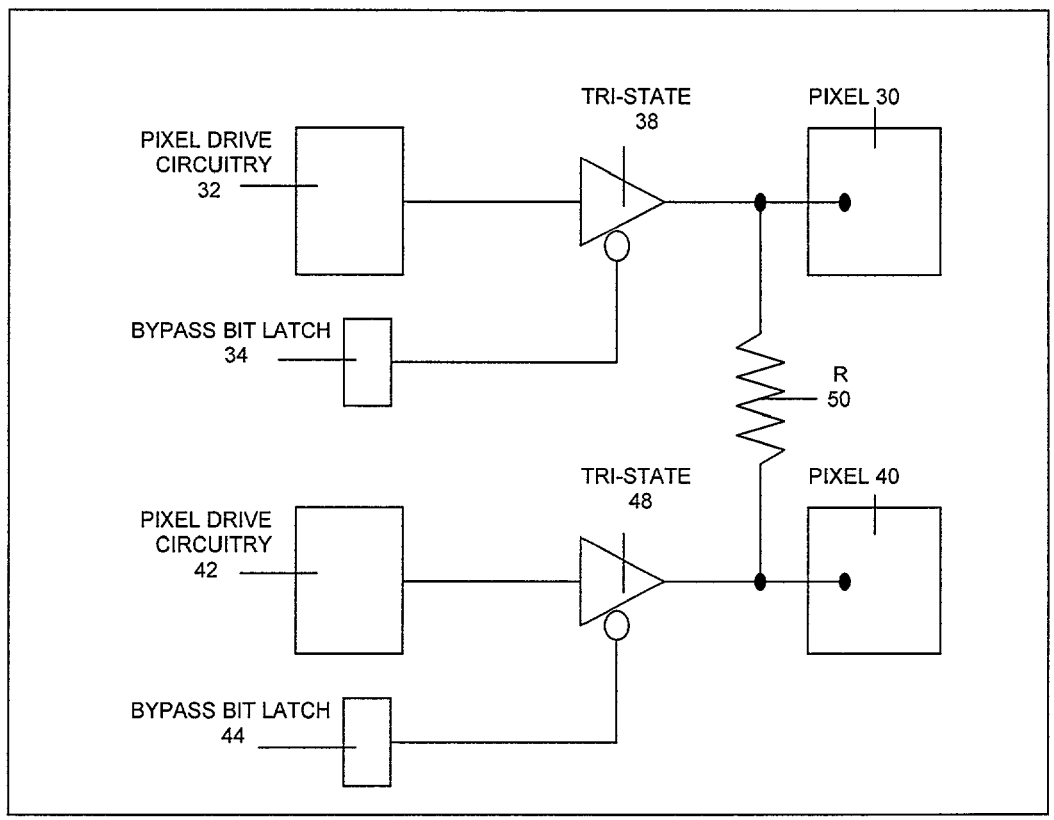
FIG. 3 shows a schematic representation of a further embodiment of repair circuitry in accordance with the present invention.

As shown in FIG. 3, the additional circuitry may alternatively comprise tri-state transistors 38, 48 associated with each respective pixel 30, 40. Transistors 38, 48 are connected to respective bypass bit latches 34, 44 and resistor 50 couples neighboring pixels 30, 40. Resistor 50 may be any suitable resistor, such as a discrete resistor, an integrated circuit resistor fabricated in metal, polysilicon, or any other suitable resistive material. As an example, assume that pixel 30 is inoperative due to defective drive circuitry 32. When bypass bit 34 is set, the transistor 38 is switched to bypass defective drive circuitry 32 so that inoperative pixel 30 is driven from working drive circuit 42 of nearby pixel 40 through the resistor 50. An advantage of such an arrangement is that testing and repair can be accomplished at any time in the manufacturing process, even after assembly of the LCD.

Figure 4:
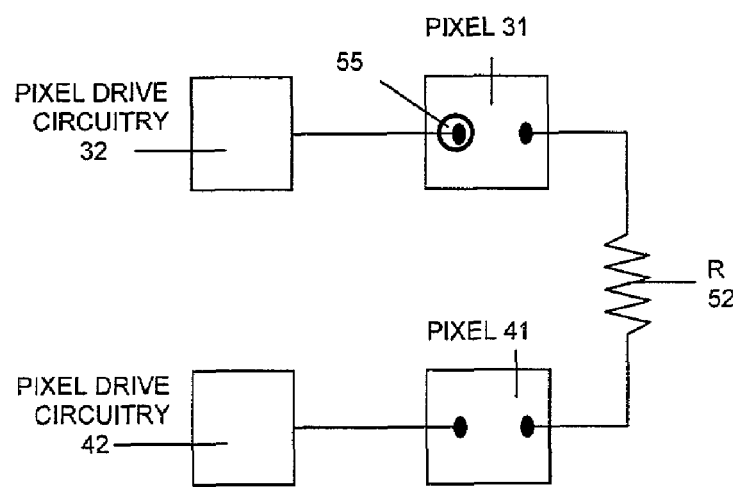
FIG. 4 shows an alternate embodiment of repair circuitry in accordance with the present invention.

In a further embodiment as shown in FIG. 4, the additional circuitry may comprise a resistor 52 coupled between pixel metal layers of nearby pixels 31, 41. Resistor 52 may comprise a discrete or integrated circuit resistor fabricated in metal, polysilicon, or any other suitable resistive material. Assuming that pixel 31 is inoperative due to defective drive circuitry 32, defective drive circuitry 32 can be disconnected from the inoperative pixel 31 by severing a via 55 connecting defective drive circuitry 32 to inoperative pixel 31, such that inoperative pixel 31 is driven by a nearby pixel 41 through the resistor 52. Because the pixel drive waveform typically consists of pulses of very low duty cycle, resistor 52 typically will not contribute significantly to the power dissipation of the device.

Additionally, since the current flowing for each pixel typically is very small, resistor 52 typically will be sufficient to drive the pixel 31 with essentially the same waveform as pixel 41.

Figure 5:
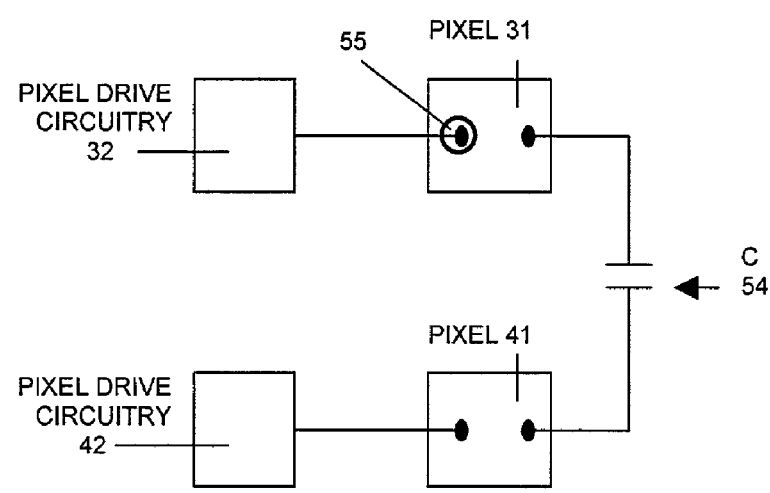
FIG. 5 shows another alternate embodiment of repair circuitry in accordance with the present invention.

As shown in FIG. 5, the additional circuitry may alternatively comprise a capacitor 54 coupled between pixel metal layers of nearby pixels 31, 41. Assuming pixel 31 is inoperative due to defective drive circuitry 32, the defective drive circuitry 32 can be disconnected from the inoperative pixel by severing a via 55 connecting the defective drive circuitry 32 to the inoperative pixel 31, such that the inoperative pixel 31 is driven by a nearby pixel 41 through the capacitor 54. Capacitor 54 may be formed from a pixel metal layer normally used for light-blocking or may comprise any other suitable capacitive connection.

The via 55 may be severed, for example, by laser ablation, melting or ablation of a fusible link by passing sufficient current through it, selective chemical etching using a photoresist or other selection means, melting or ablation with an electron beam, melting or ablation with a focused microwave or other electromagnetic beam, electro-ionic erosion, physical cutting or removal of the metal using a sharp or abrasive implement or probe, or by any other suitable technique. The via 55 may comprise a fuseable link between the drive circuitry and the pixel, and the link may be "blown", e.g., by applying a suitable short circuit voltage across the link, or by any other suitable technique.

The pixels may be repaired individually or in groups. In one embodiment of the invention, the amount of circuitry per pixel is reduced by sharing the bypass bit latch amongst a group of pixels. If the drive circuit for any pixel in the group fails, the bypass bit is set for that group, and each pixel in the group is then driven by the circuitry of a nearby pixel. The drive circuit used for each repaired pixel may be different or the same for each pixel in the group. Even though some working pixels are bypassed in the group, the overall quality of the display is still improved by removing the stuck-ON or stuck-OFF defect(s). Groups may be any size depending on the demands of the application, but typically groups larger than 8 pixels begin to have diminishing returns in terms of space saved in relation to quality of the repair.

Figure 6:
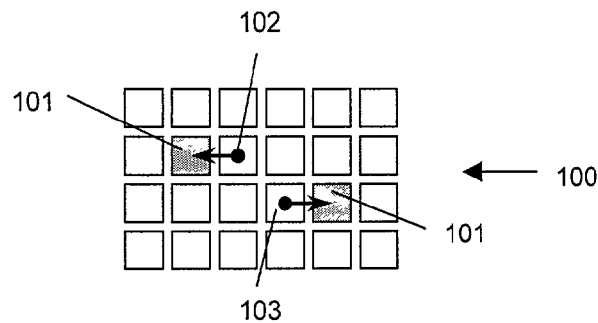
FIG. 6 shows examples of various pixel repair configurations.
Figure 6:
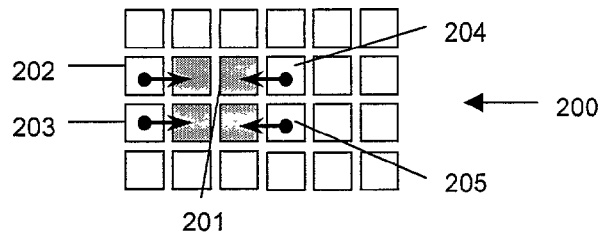
Figure 6:
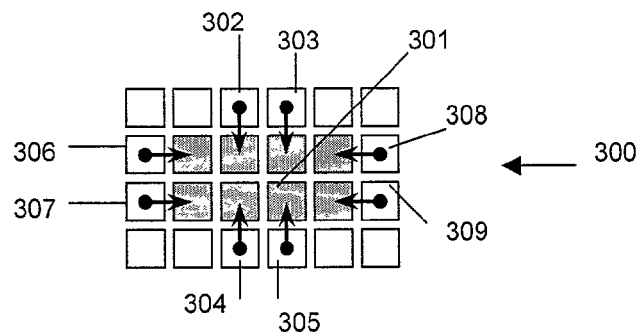
Figure 6:
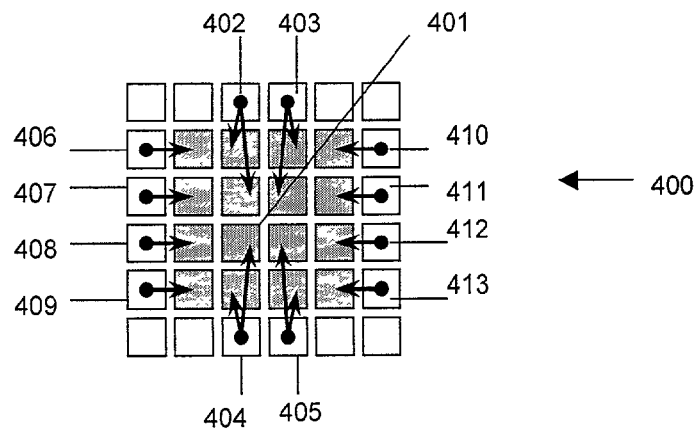

FIG. 6 shows examples of various pixel repair configurations, including examples of individual pixel repair and examples of various pixel repair groupings. In the repair example 100, the defective pixels 101 may be driven by an adjacent pixel located either to the left or the right of the defective pixel (e.g., pixels 102 and 103). In repair example 200, a 4 pixel group (2×2) of defective pixels is repaired by driving the defective pixels 201 using the drive circuitry of pixels located to the left (202, 203) or the right (204, 205) of the 4 pixel group. In repair example 300, an 8 pixel group (4×2) of defective pixels 301 is repaired using pixels located above (302, 303), below (304, 305), to the left (306, 307) and to the right (308, 309). In repair example 400, a 16 pixel group (4×4) of defective pixels 401 is repaired using pixels above (402, 403), below (404, 405), to the left (406, 407, 408, 409), and to the right (410, 411, 412, 413). Pixels 402, 403, 404, and 405 are shown as driving a respective adjacent pixel as well as a respective pixel located in the interior of the 4×4 defective pixel block 401. It will be appreciated that any of the other pixels (406-413) can be used to drive an adjacent pixel and an interior pixel.

The repair examples shown in FIG. 6 are illustrative examples, and it will be appreciated that a defective pixel may be driven by any of the adjacent pixels (including for example, pixels located above, below, or diagonally from the defective pixels). Further, it will be appreciated that defective pixels may be repaired by connecting the defective pixels to the drive circuitry of non-adjacent pixels (as shown, for example, in repair example 400).

In a further embodiment, the display may also comprise test circuitry to identify the defective drive circuitry. For example, all the pixels in a row may be tested in parallel using wired-OR and wired-AND circuitry. Rows with an inoperative pixel will then be subject to an additional series of tests to identify the exact pixel in the row that is inoperative.

The pixel drive circuitry associated with each pixel may be located adjacent to each pixel or located separately from each pixel. Moving the drive circuitry for each pixel so it is not necessarily physically located under the pixel that it drives allows for nearby repair partner pixels with non-adjacent drive circuitry. Depending on the size of defects that may occur, the drive circuitry for repair partners can be located one, two, or more pixels away from the pixels that they drive. Since the total number of defects typically is small, the probability of two independent defects damaging any given pair of repair partner pixels becomes negligible.

The display may be a liquid crystal micro-display or other suitable displays that comprise integrated circuit manufacturing techniques.

It should now be appreciated that the present invention provides an improved method and apparatus for repairing inoperative pixels in a display. In particular, the invention provides an improved method and apparatus for repairing defective pixels in a liquid crystal micro-display without the need to provide redundant drive circuitry underneath each pixel.

Although the invention has been described in connection with various preferred embodiments, it should be appreciated that numerous adaptations and modifications can be made thereto without departing from the scope of the invention as set forth in the claims. In particular, the invention is not limited to liquid crystal micro displays, and can be used in connection with the many different types of display technology.

What is claimed is:

1. A method for mitigating defects caused by inoperative pixels in a liquid crystal micro-display built on a silicon integrated circuit substrate, the substrate having an integral complimentary metal-oxide semiconductor (CMOS) control chip containing CMOS drive circuitry, the drive circuitry comprising a plurality of pixel drive circuits, each pixel drive circuit electrically connected to a corresponding pixel, the method comprising:
    identifying a defective pixel drive circuit electrically connected to an inoperative pixel;
    disconnecting the electrical connection between the defective pixel drive circuit and the inoperative pixel; and
    electrically connecting the inoperative pixel to a working pixel drive circuit coupled to a nearby pixel such that the defective pixel drive circuit is bypassed and the inoperative pixel is driven from the working pixel drive circuit of the nearby pixel, the nearby pixel comprising one of an adjacent pixel or a non-adjacent pixel.

2. A method in accordance with claim 1, wherein electrically connecting comprises using a bypass bit latch comprising a bypass bit, and wherein the bypass bit is loaded from an external memory after the display is turned on.

3. A method in accordance with claim 1, further comprising: multiplexing the drive circuits of each pixel with the drive circuit of a nearby pixel.

4. A method in accordance with claim 1, wherein electrically connecting comprises using a bypass bit latch comprising a bypass bit, and wherein the method further comprises:
    providing a tn-state transistor associated with each pixel which is connected to the bypass bit latch; and
    providing a resistor for coupling neighboring pixels;
    such that when the bypass bit is set, the transistor is switched to bypass the defective pixel drive circuit so that the inoperative pixel is driven from the working pixel drive circuit of a nearby pixel through the resistor.

5. A method in accordance with claim 1, wherein defects of the inoperative pixels are mitigated in groups.

6. A method in accordance with claim 1, wherein identifying defective pixel drive circuit further comprises providing test circuitry associated with the display.

7. A method in accordance with claim 1, wherein the pixel drive circuitry associated with each pixel is located separately from each pixel.

8. A liquid crystal micro-display apparatus capable of mitigating defects caused by inoperative pixels, comprising:
    a plurality of pixels;
    a complimentary metal-oxide semiconductor (CMOS) control chip integral to a silicon integrated circuit substrate of the micro display, the CMOS control chip comprising a plurality of pixel drive circuits, each pixel drive circuit electrically connected to a corresponding pixel,
    means for disconnecting the electrical connection between the defective pixel drive circuit and an inoperative pixel; and
    a means for electrically connecting the inoperative pixel to a working pixel drive circuit of a nearby pixel, such that the defective pixel drive circuit is bypassed and the inoperative pixel is driven from the working pixel drive circuit of the nearby pixel, the nearby pixel comprising one of an adjacent pixel or a non-adjacent pixel.

9. Apparatus in accordance with claim 8, wherein the means for electrically connecting comprises a bypass bit latch comprising a bypass bit that is loaded from an external memory after the display is turned on.

10. Apparatus in accordance with claim 8, further comprising: multiplexing circuitry associated with the connecting means.

11. Apparatus in accordance with claim 8, wherein the means for electrically connecting comprises a bypass bit latch comprising a bypass bit, and wherein the apparatus further comprises:
    a tri-state transistor associated with each pixel connected to the bypass bit latch; and
    a resistor coupling neighboring pixels;
    such that when the bypass bit is set, the transistor is switched to bypass the defective pixel drive circuit so that the inoperative pixel is driven from the working pixel drive circuit of a nearby pixel through the resistor.

12. Apparatus in accordance with claim 8, wherein defects of the inoperative pixels are mitigated in groups.

13. Apparatus in accordance with claim 8, further comprising test circuitry to identify the defective pixel drive circuit.

14. Apparatus in accordance with claim 8, wherein the pixel drive circuitry associated with each pixel is located separately from each pixel.

15. A method in accordance with claim 1, wherein the defective CMOS pixel drive circuit is identified after the CMOS control chip and the liquid crystal material are assembled together.

16. A method in accordance with claim 15, wherein the inoperative pixel is identified via an optical inspection of the display after assembly of the display.

17. Apparatus in accordance with claim 8, wherein the defective CMOS pixel drive circuit is identified after the CMOS control chip and the liquid crystal material are assembled together.

18. Apparatus in accordance with claim 17, wherein the inoperative pixel is identified via an optical inspection of the display after assembly of the display.

* * * * *